US009762862B1

(12) United States Patent
Worley, III et al.

(10) Patent No.: US 9,762,862 B1
(45) Date of Patent: Sep. 12, 2017

(54) OPTICAL SYSTEM WITH INTEGRATED PROJECTION AND IMAGE CAPTURE

(71) Applicant: Amazon Technologies, Inc., Seattle, WA (US)

(72) Inventors: William Spencer Worley, III, Half Moon Bay, CA (US); Christopher D. Coley, Morgan Hill, CA (US); Eric G. Marason, San Francisco, CA (US); William Thomas Weatherford, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 613 days.

(21) Appl. No.: 13/633,015

(22) Filed: Oct. 1, 2012

(51) Int. Cl.
*H04N 7/18* (2006.01)
*G01B 11/02* (2006.01)

(52) U.S. Cl.
CPC ..................................... *H04N 7/18* (2013.01)

(58) Field of Classification Search
CPC ....... G01B 11/022; G01B 11/024; H04N 7/18
See application file for complete search history.

(56) References Cited

U.S. PATENT DOCUMENTS

| 7,375,803 | B1 * | 5/2008 | Bamji | 356/4.01 |
| 7,627,139 | B2 * | 12/2009 | Marks et al. | 382/103 |
| 8,411,194 | B2 * | 4/2013 | Davis et al. | 348/340 |
| 2007/0139772 | A1 * | 6/2007 | Wang | 359/497 |
| 2007/0201863 | A1 * | 8/2007 | Wilson et al. | 396/429 |
| 2008/0213732 | A1 * | 9/2008 | Manard et al. | 434/16 |
| 2008/0252596 | A1 * | 10/2008 | Bell et al. | 345/156 |
| 2010/0182457 | A1 * | 7/2010 | Furui | 348/231.7 |
| 2012/0223885 | A1 | 9/2012 | Perez | |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Thai Tran
*Assistant Examiner* — Christopher T Braniff
(74) *Attorney, Agent, or Firm* — Lee & Hayes, PLLC

(57) ABSTRACT

A device includes a projection and camera system to create an augmented reality environment in which images are projected onto a scene and user movement within the scene is captured. The projection and camera system have a camera to image scattered light from the environment and determine depth of objects in the environment. The system also has a projector to project the images onto the scene. The projection images and captured environment images share a common optical path through the same lens. The system includes an image noise cancelation system to cancel, remove, or otherwise reduce unwanted image noise caused by internal reflection of the projection images from the environment images.

31 Claims, 13 Drawing Sheets

OPTICAL SYSTEM WITH INTEGRATED PROJECTION AND IMAGE CAPTURE

BACKGROUND

Augmented reality allows interaction among users, real-world objects, and virtual or computer-generated objects and information within an environment. The environment may be, for example, a room equipped with computerized projection and image capture systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection and image capture systems. Such improvements might include lighter weight, smaller form factors, and less obtrusive integration into the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein is an architecture to create an augmented reality environment. The architecture may be implemented in many ways. One illustrative implementation is described below in which an augmented reality environment is created within a room. The architecture includes one or more projection and camera systems. Multiple implementations of various projection and camera systems are described. In one implementation, for example, the projection and camera system is implemented to resemble a table lamp. However, the various implementations of the architecture described herein are merely representative.

In implementations that utilize a small form factor, such as locating both a projector and camera in a head structure of a lamp-like device (described below), the projector and camera share at least part of the same optical path. This allows the system to achieve a very compact size. However, this arrangement also introduces a challenge in that the images projected by the projector may be at least partly reflected internally, thereby causing image noise on the images received from the augmented reality environment that are being captured by the camera. That is, the camera captures not only the environment images, but also parts of the projection images being internally reflected during output from the system. Accordingly, described herein are various techniques to cancel, remove, or otherwise reduce the unwanted image noise caused by internal reflection along the same optical path.

Illustrative Environment

Figure 1:
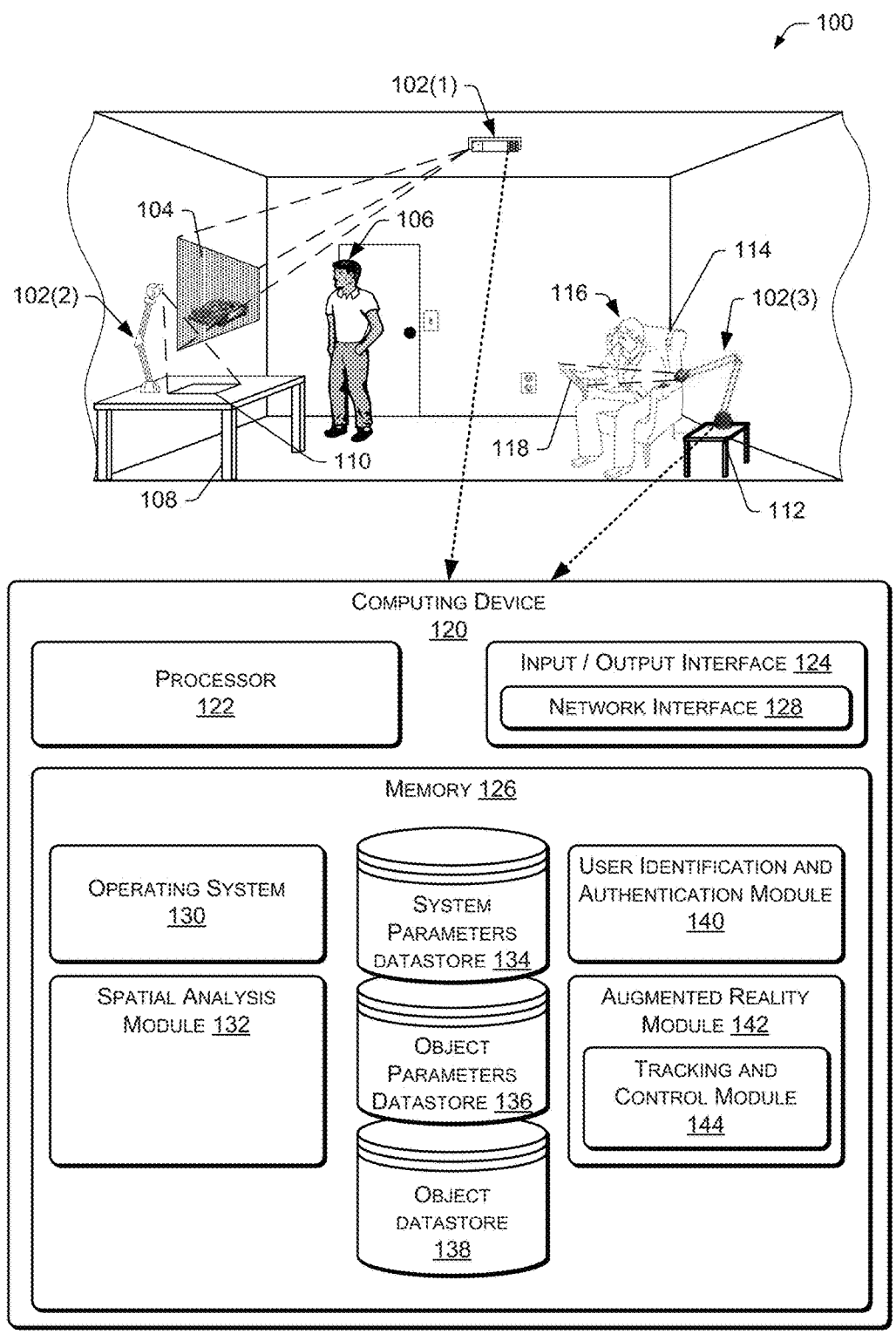
FIG. 1 shows an illustrative scene with an augmented reality environment hosted in an environmental area, such as a room. The augmented reality environment is provided, in part, by three projection and image capture systems.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. One implementation of the first ARFN 102(1) is provided below in more detail with reference to FIG. 2.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on in furniture, on the wall, beneath a table, and so forth.

Associated with each ARFN 102(1)-(3), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

First ARFN Implementation—Separate Optical Paths

Figure 2:
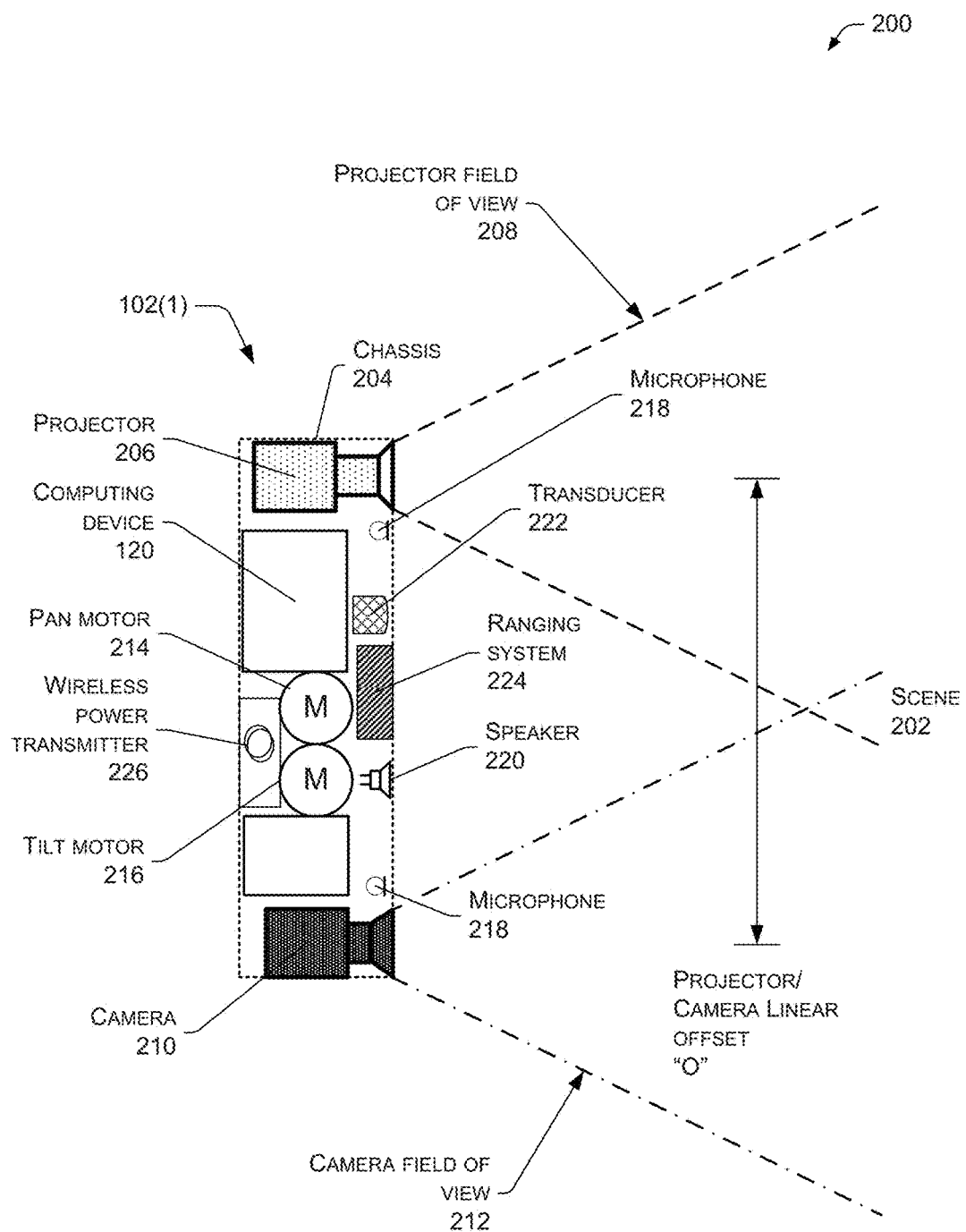
FIG. 2 shows a first implementation of a projection and image capture system formed as an augmented reality functional node having a chassis to hold a projector and camera in spaced relation to one another. In this implementation, the projector and camera have different optical paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be an RGB camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
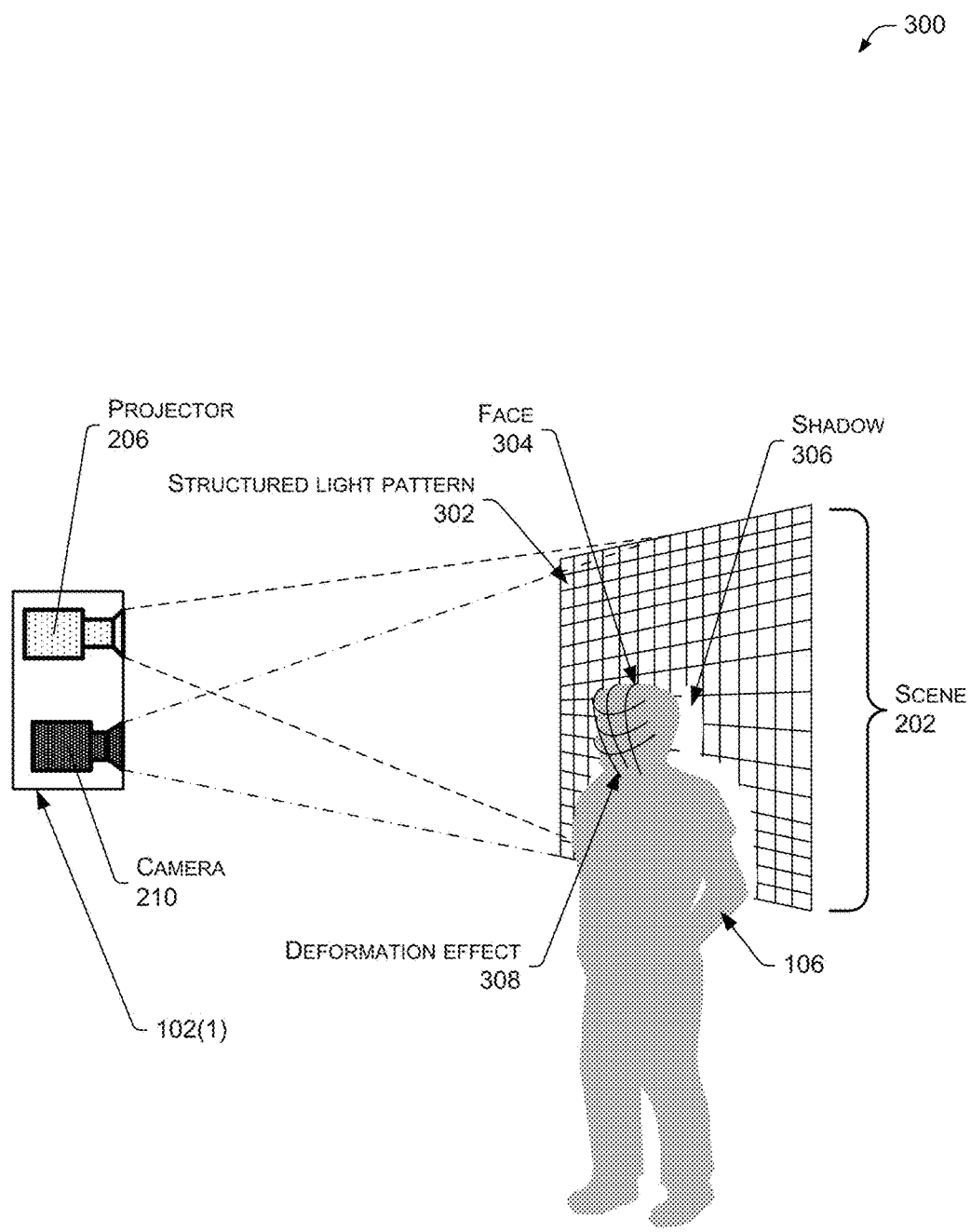
FIG. 3 illustrates one example implementation of creating an augmented reality environment by projecting a structured light pattern on a scene and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

Second ARFN Implementation—Common Optical Path

As noted above, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as represented by the ARFNs 102(2) and 102(3) in FIG. 1, removes the offset through a design that allows the projector and camera to share a common optical path. In this design, the form factor may be reduced. In the example shown in FIG. 1, the ARFNs 102(2) and 102(3) are embodied as common table lamps, where the projector and camera reside in a head of the lamp.

Figure 4:
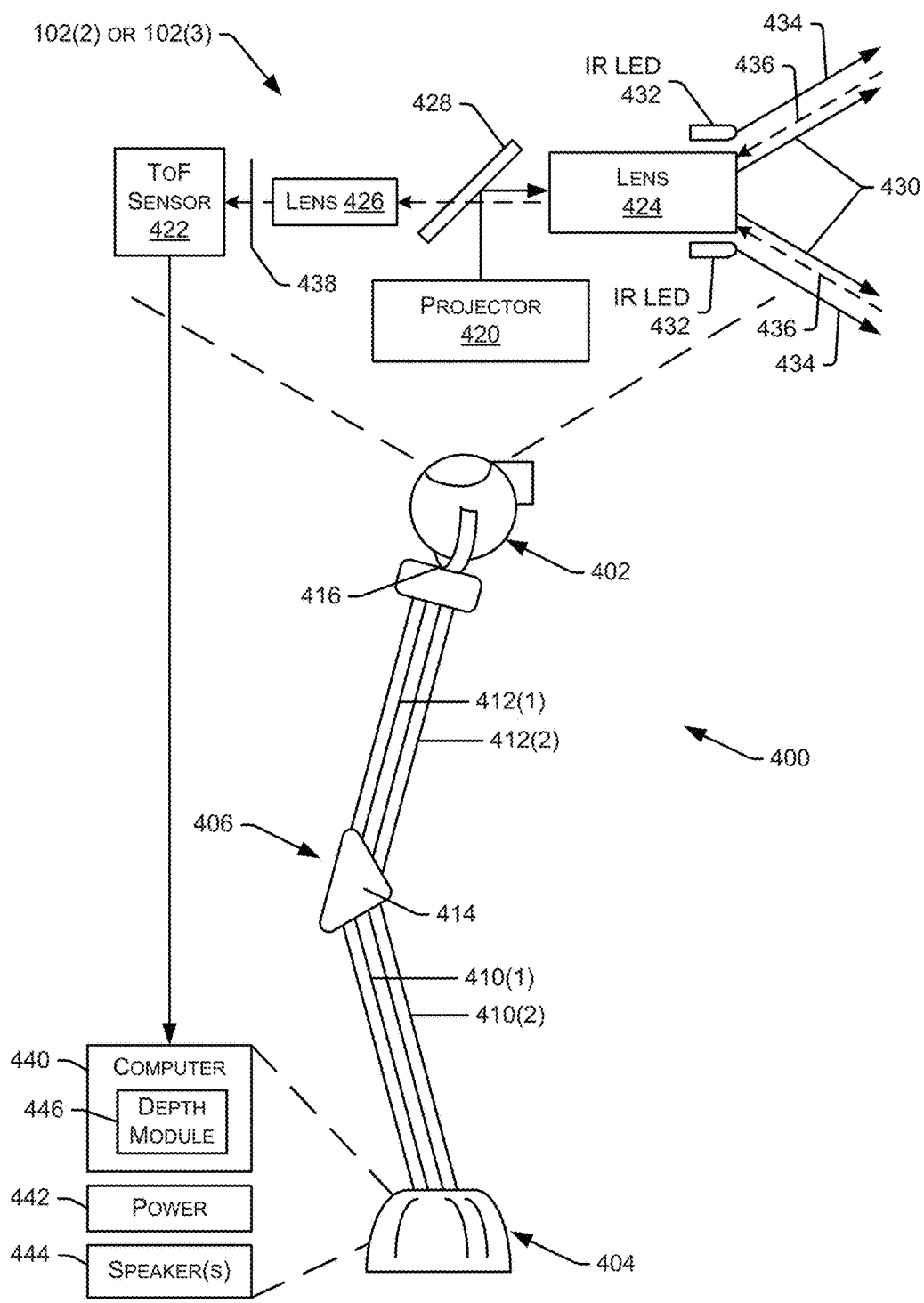
FIG. 4 shows a second implementation of a projection and image capture system formed to resemble a familiar type of furniture, such as a table lamp. In this implementation, the projector and camera share a common optical path through a lens.

FIG. 4 shows one implementation of the ARFN 102(2) or 102(3), implemented as part of a table lamp, although it may be incorporated into other familiar types of furniture. The table lamp 400 has a head 402 attached to a base 404 by a movable arm mechanism 406. As illustrated, the arm mechanism 406 has two base members or rods 410(1) and 410(2) connected to two head members or rods 412(1) and 412(2) via a joint connector 414. Other configurations of the arm mechanism 406 may be used. In the illustrated implementation, the head 402 is connected to the arm mechanism 406 via a universal connector 416 that enables at least two degrees of freedom (e.g., along tilt and pan axes). The universal connector 416 is described below in more detail with reference to FIG. 7. In other implementations, the head 402 may be mounted to the arm mechanism 406 in a fixed manner, with no movement relative to the arm mechanism 406, or in a manner that enables more or less than two degrees of freedom.

The head 402 holds several components, including a projector 420 and a time of flight (ToF) sensor 422. In this example, the ToF sensor 422 measures IR signal reflections from objects within the scene. The ToF sensor 422 may be implemented as a standalone sensor, or as part of a camera. The head 402 also contains one or more lenses, including a first lens 424 and a second lens 426. The first lens 424 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 424 may further include a motorized focus, a motorized zoom, and a motorized iris.

The second lens 426 is provided to adjust for the differences between the projection imager and the ToF imager. This allows for the device to set relative coverage of the two imagers (e.g., over scan/under scan). For instance, the projector may project a larger image than the ToF sensor 422 is configured to capture. The lens 426 adjusts for this difference, allowing for different size imagers to be used.

The projector 420 projects an image that is reflected off an angled beam splitter 428 and out through the lens 424. The beam splitter 428 may be, for example, embodied as a dichroic beam splitter having a mirrored prism assembly that employs dichroic optical coatings to divide light. The projected image has a field of view represented by the outgoing pair of arrows 430. In this manner, the visible and high intensity light from the projector can be zoomed for image projection on a wide range of surfaces, from near view to far view surfaces.

One or more IR emitters 432, such as IR LEDs or lasers, are positioned in the head 402 relative to the lens 424. The IR emitters 432 direct IR light in the direction of the projected image to illuminate the scene onto which the images are being projected. The IR emitters 432 may be arranged such that the illumination field is wider than the projected field, as represented by the outgoing pair of arrows 434.

The IR signals are scattered from objects in the scene and returned to the lens 424, as represented by the incoming pair of arrows 436. The captured IR signals are passed through the lens 424 and through the dichroic beam splitter 428 to the secondary lens 426. The IR signals are then passed through an IR band pass filter 438 (or other filter type) to the ToF sensor 422. Accordingly, the IR signals are emitted out from the head 402, scattered by the objects, and collected by the head 402 for capture by the ToF sensor 422 as a way to image the scene. This technique is performed in lieu of using structured light, as implemented in the implementation of the first ARFN 102(1).

The lamp-based ARFN 102(2) or 102(3) may also be equipped with one or more components in the base 404. In this example, a computer 440 resides in the base 404, along with power components 442 and one or more speakers 444. The computer 440 may include processing and memory to execute instructions. A depth module 446 may be executed by the computer 440 to measure a time of flight for an IR signal (or other modulated light output). The time-of-flight value may be derived as a function of a time lapsed between emission from IR LEDs or lasers 432 and capture by the ToF sensor 422. Alternatively, the time-of-flight value may be derived as a function of the phase difference between the modulated light output and the returned light. The depth module may be implemented in software or hardware. It is noted that in other implementations, the components shown as residing in the base 404 may reside in the head 402 or arm mechanism 406. For instance, the computer 440 may be located in the head, and the speakers may be 444 may be distributed in multiple locations, including the base, arm mechanism, and/or the head.

Notice that in this implementation of FIG. 4, the projector 420 and the sensor 422 share a common optical path through a common lens 424. As a result, the ARFN may be made more compact to a smaller form factor, as one set of lenses are removed in this design as compared to the offset design for FIG. 2.

Figure 5:
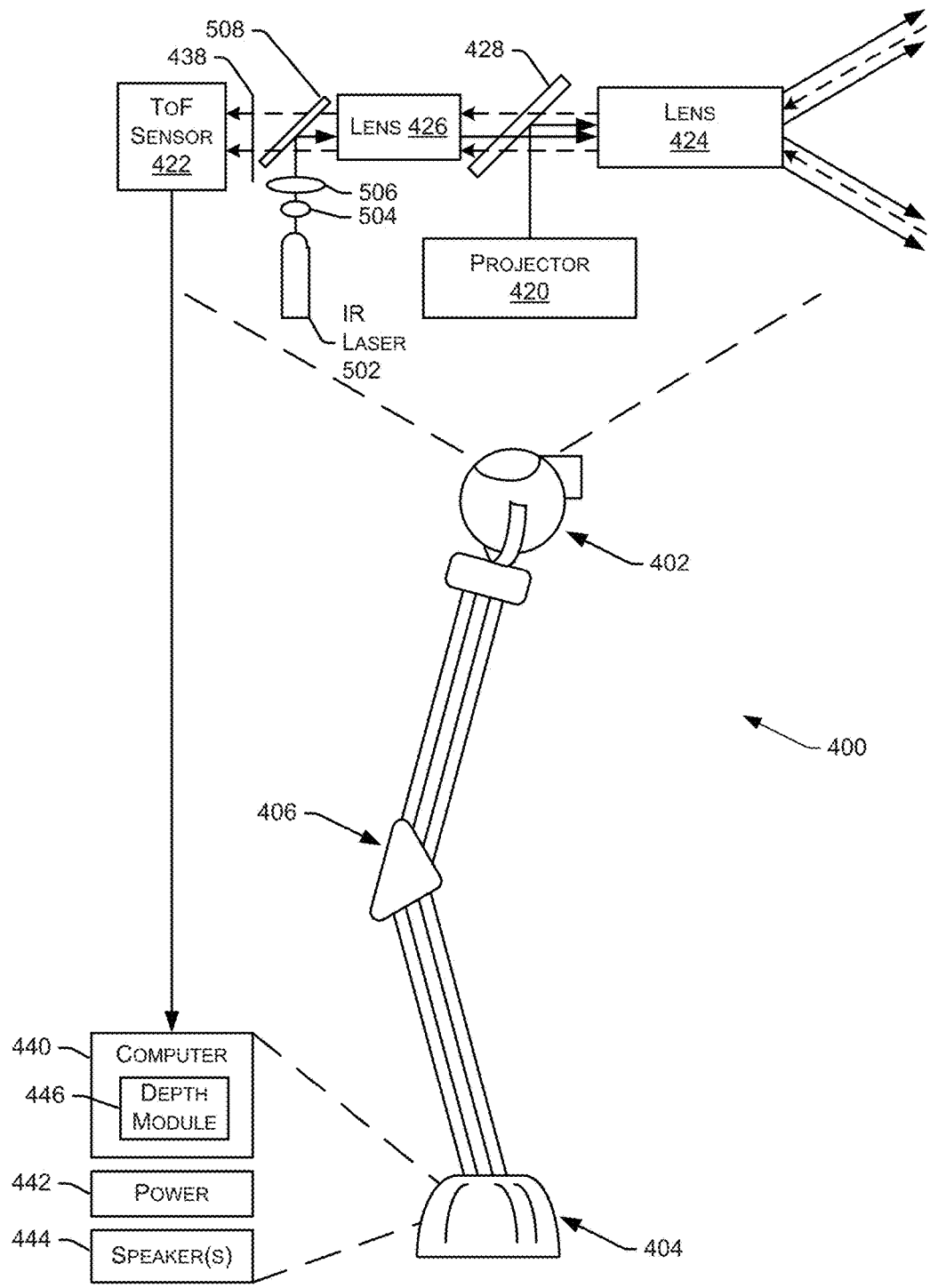
FIG. 5 shows a third implementation of a projection and image capture system, which is formed to resemble a table lamp similar to the embodiment of FIG. 4. In this implementation, the projector and camera share a common optical path through a lens, and illumination components also share the same optical path.

FIG. 5 shows another implementation of the ARFN 102(2) or 102(3), also shown implemented as part of a table lamp 400. This implementation differs from that of FIG. 4 in that the illumination system also shares the same optical path as the projector 420 and the ToF sensor 422.

In FIG. 5, an IR laser 502 is used in place of the IR LEDs or lasers 432 of FIG. 4. The IR laser 502 outputs an IR beam that is expanded by a beam expander 504 and then concentrated by a focus lens 506 onto an angled beam splitter 508. In one implementation, the angled beam splitter 508 is formed of a material that passes light (e.g., glass) and has a reflective patch at its center. The focus lens 506 concentrates the IR beam onto a reflective patch of the beam splitter 508, which directs the beam through lens 426, through the beam splitter 428, and out through the lens 424. With this arrangement, the size and area of interest can be controllably illuminated by use of the lens 424 and modulated IR laser light. The illuminated area is roughly the same size, or slightly larger, than the area onto which images are projected, as is shown in more detail with reference to FIG. 6.

IR signals scattered from a populated landscape are then collected by the head 402 and passed back through the lens 424, through the beam splitter 428, through lens 426, through the non-reflective portion of the angled reflector 508, through the filter 438, and to the ToF sensor 422. Accordingly, the collected scattered IR light forms an image on the ToF sensor 422 that is used to compute time of flight values for depth analysis of the landscape of the scene.

One of the advantages of placing the IR laser 502 as shown and passing the IR beam through the lens system is that the power used for illumination may be reduced as compared to the implementation of FIG. 4, where the IR LEDs are external to the optical path. Illumination typically degrades inversely proportional to the square of the distance. In FIG. 4, the forward and return paths result in an illumination inversely proportional to the distance to the power of four. Conversely, illumination through the same lens means that the returned light is inversely proportional to square of the distance, and therefore can use less strong illumination to achieve the same results.

Both implementations of the integrated projection and camera system afford advantages in addition to a smaller form factor. The projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

Figure 6:
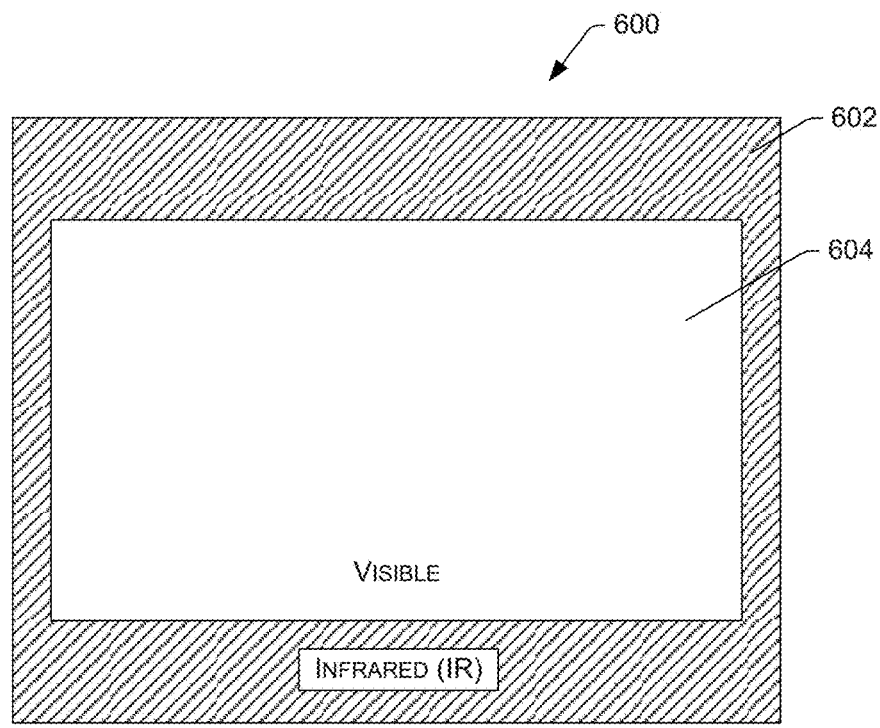
FIG. 6 shows a first area of illumination and a second area of image capture that may be realized by the implementations of FIGS. 4 and 5.

FIG. 6 shows a coverage pattern 600 provided by the ARFN 102(2) or 102(3). The coverage pattern 600 has an illumination area 602 covered by the IR-based illumination system. The coverage pattern 600 also has a projection area 604 covered by the projected image. As shown in this footprint, the illumination area 602 is larger than, and encompasses, the projection area 604. However, in other implementations, the illumination area 602 may be equal to or smaller than, and be encompassed by, the projection area 604. The second lens 426 in the device allows for adjustment in the relative coverage to enable overscan or underscan conditions.

Figure 7:
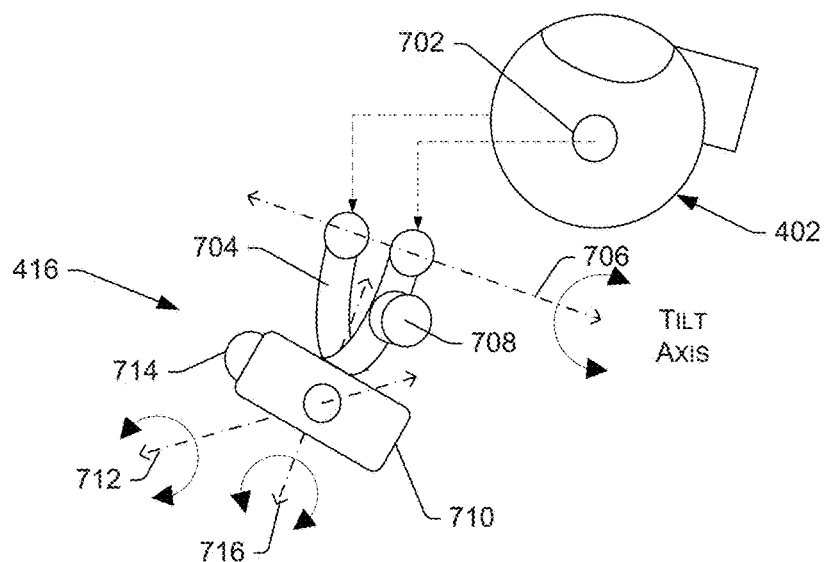
FIG. 7 shows an exploded view of a head and universal mount of the lamp implementation shown in FIGS. 4 and 5.

FIG. 7 shows an exploded view 700 of the head 402 and the universal mount 416 of the lamp implementation shown in FIGS. 4 and 5. Here, the head 402 is generally spherical, although it may be made of any shape, size or form factor. The head 402 has two mounting members 702 on opposing sides of the sphere. The mounting members 702 may be pivotally mounted within a U-shaped cradle 704 to facilitate rotation about a tilt axis 706. A tilt motor 708 may be included to move the head 402 about the tilt axis 706.

The U-shaped cradle 704 is movably mounted relative to structural bracket 710. The U-shaped cradle 704 may be pivoted about a pan axis 712. A pan motor 714 may be included to pivot the U-shaped cradle 704 and head 402 about the pan axis 712. Additionally, the U-shaped cradle 704 may be rotatable about an axis 716 to rotate or spin relative to the structural bracket 710.

Figure 8:
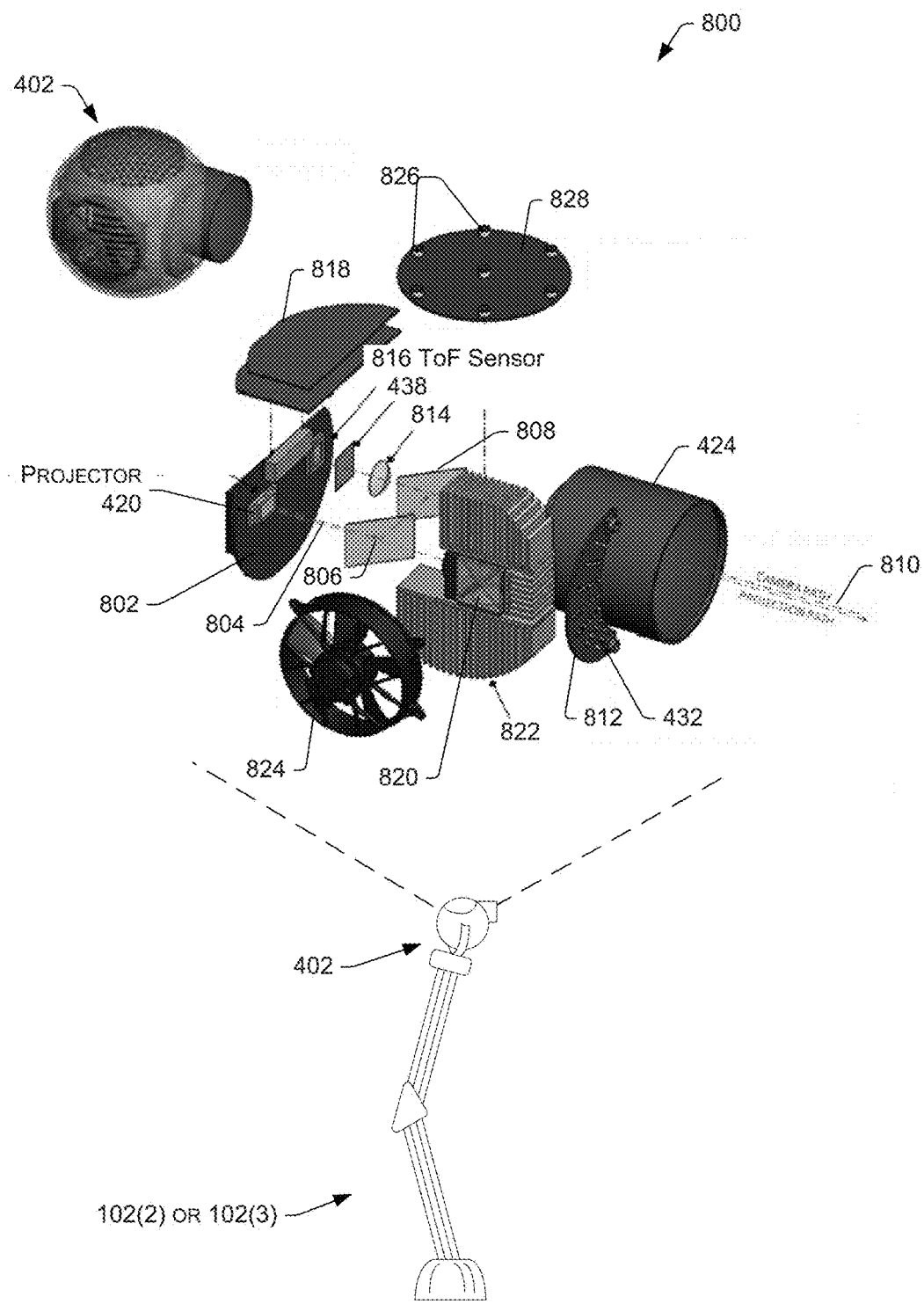
FIG. 8 shows an exploded view of components in the lamp head according to one implementation.

FIG. 8 shows an exploded view 800 of components in the head 402 of the lamp-embodied ARFN 102(2) or 102(3) according to one implementation. The head 402 includes the projector 420, implemented here as a projector imaging chip mounted on a printed circuit board (PCB) 802. The projector 420 outputs a light beam 804 that is reflected by a first angled reflector 806 and reflected again by a beam splitter 808. From the beam splitter 808, the projected light 804 is on a common optical path 810 through the lens 424.

A front PCB 812 carries an array of IR LEDs or lasers 432 for illuminating the scene. The IR LEDs or lasers 432 emit IR beams that go into the environment, bounce off objects, and return to the lens 424. The returning IR signals are passed through the beam splitter 808, through a sensor lens 814 and IR filter 438, and onto the ToF IR sensor 816. The front PCB 812 may further mount two RGB cameras: one with a wide field of view and one with a narrow field of view. A rear PCB 818 carries the electronics for the projector 420 and ToF IR sensor 816.

A light source 820 illuminates the projector imaging chip. The light source 820 may be an LED; laser; filament, arc, or other lamp; and so forth. A heat sink 822 is shown formed around the light source 820 to help dissipate heat. A cooling fan 824 may also be included in the head 420.

An array of microphones 826 is mounted on a PCB 828 to capture sound from the environment. This particular array has 7 microphones, with one microphone at the center of a circle of six microphones. However, in other implementations, any number of microphones may be used in any number of arrangements.

Figure 9:
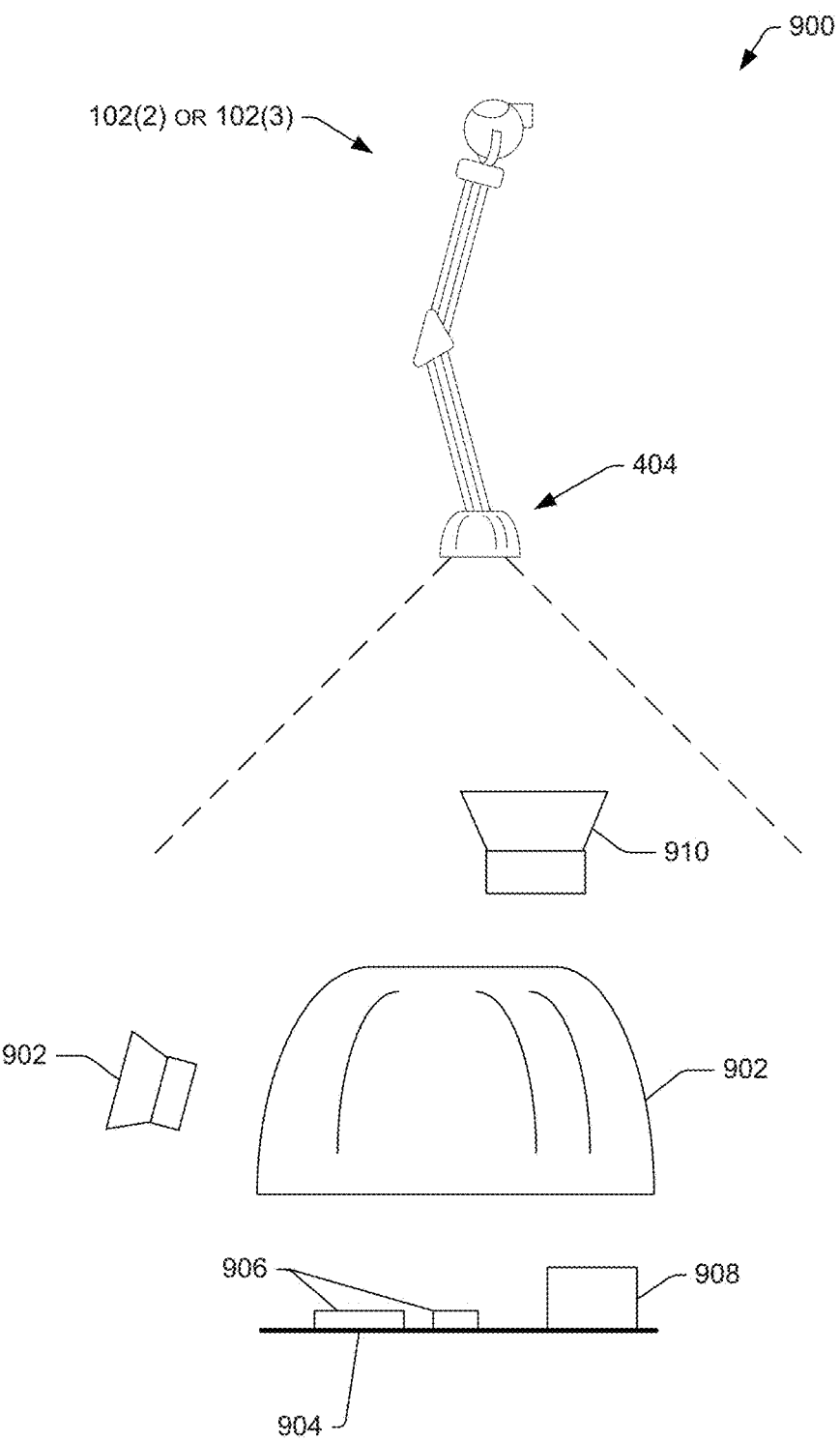
FIG. 9 shows an exploded view of components in a base of the lamp according to one implementation.

FIG. 9 shows an exploded view 900 of components in the base 404 of the lamp-embodied ARFN 102(2) or 102(3) according to one implementation. The base 404 includes a housing 902 formed of a material suitable to encase the active components and to provide sufficient weight to hold the lamp on a surface while the head and arm mechanism are moved and fully extended in various directions. A PCB 904 is mounted in the bottom of the housing 902 and defines the main logic board of the ARFN 102. The PCB 904 holds various computing components 906 of computer 440, such as processor(s), memory, and I/O interfaces. A power supply 908 is also provided on the PCB 904.

One or more speakers may be arranged within the housing 902. Two speakers 910 and 912 are illustrated in FIG. 9. The first speaker 910 is a low frequency speaker, while the second speaker 912 has a mid to high frequency range.

Figure 10:
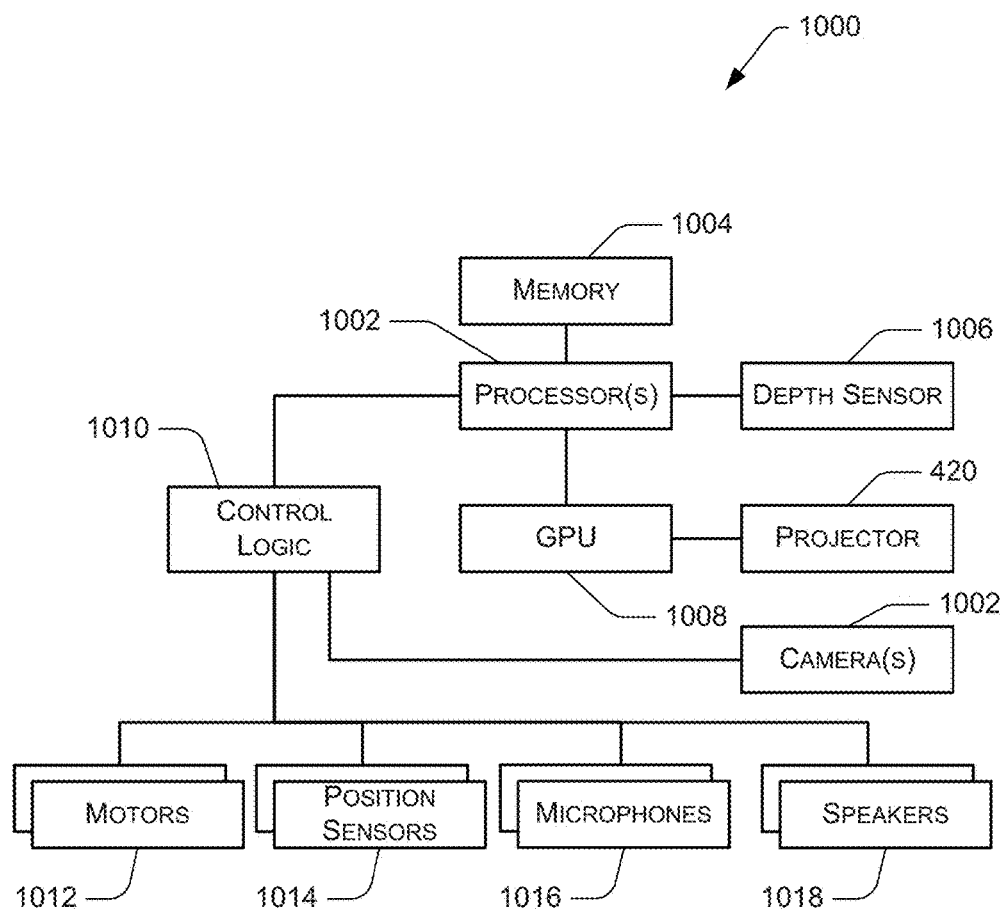
FIG. 10 is a block diagram of functional components that may be used in the implementations of FIGS. 4 and 5.

FIG. 10 shows functional components 1000 that may be implemented as part of the lamp-embodied ARFN 102(2) or 102(3) of FIGS. 4 and 5, respectively. The functional components 1000 include one or more processors 1002 coupled to memory 1004. A depth sensor 1006 may be coupled to the processor 1002, formed as part of the processor 1002, or implemented as firmware/software stored in the memory 1004 and executed on the processor 1002. A separate graphics processing unit (GPU) 1008 may be coupled to the processor 1002 to generate the images to be projected by the projector 420. The GPU 1008 may also be used for other processing, such as image processing and depth analysis.

Control logic 1010, such as a field programmable gate array (FPGA), is shown coupled to the processor 1002 to control various electrical and mechanical components. For instance, the control logic 1010 may be coupled to control various motors 1012, such as the tilt motor 708 and the pan motor 714 of the universal connector 416 in FIG. 7. The control logic 1010 may also be coupled to control position sensors 1014, microphones 1016 (e.g., microphones 826 in FIG. 8), and speakers 1018 (e.g., speakers 910 and 912 in FIG. 9). The control logic 1010 may also be used for other processing tasks, as configured. It is further noted that FIG. 10 shows one representative set of functional components and interconnections. In other implementations, a different collection of functional components and/or different connections between the components may be used to achieve the functions described herein.

Internal Image Noise Cancelation

When using a component arrangement in which the projector, camera, and time-of-flight sensor share a common optical path, such as the ARFNs 102(2) and 102(3) of FIGS. 4 and 5, a potential problem is introduced in that the projected images may partially reflect internally as they travel along the optical path. This internal reflection introduces image noise on the images received from the augmented reality environment that the camera is attempting to capture. That is, the camera captures not only the environment images receive along the optical path, but also parts of the original projection images that are internally reflected during projection from the system.

Figure 11:
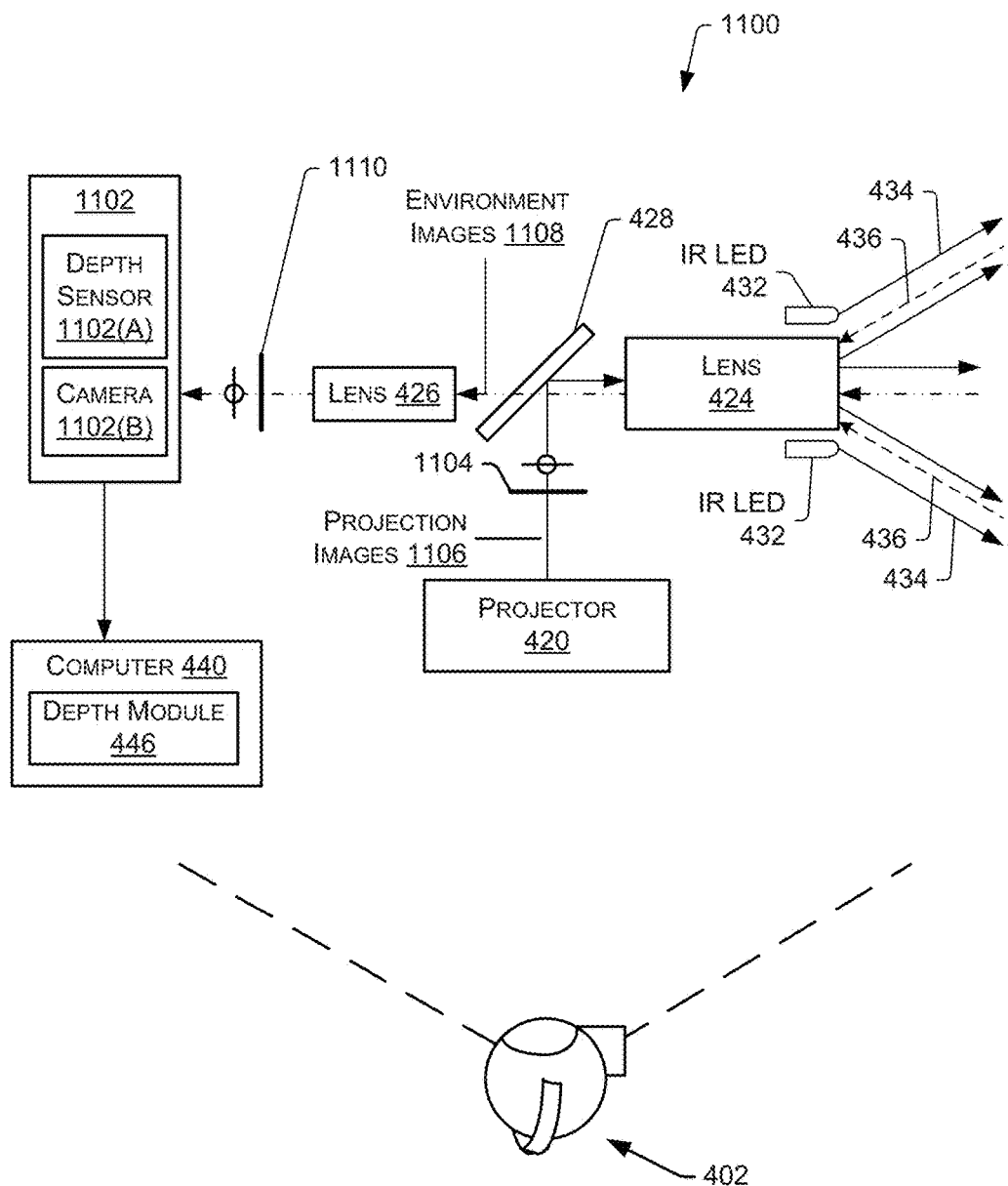
FIG. 11 shows a projection and camera system that shares a common optical path similar to FIG. 4, but is also implemented with a first type of image noise cancelation component that reduces or removes image noise caused by internal reflection of the projected image.
Figure 12:
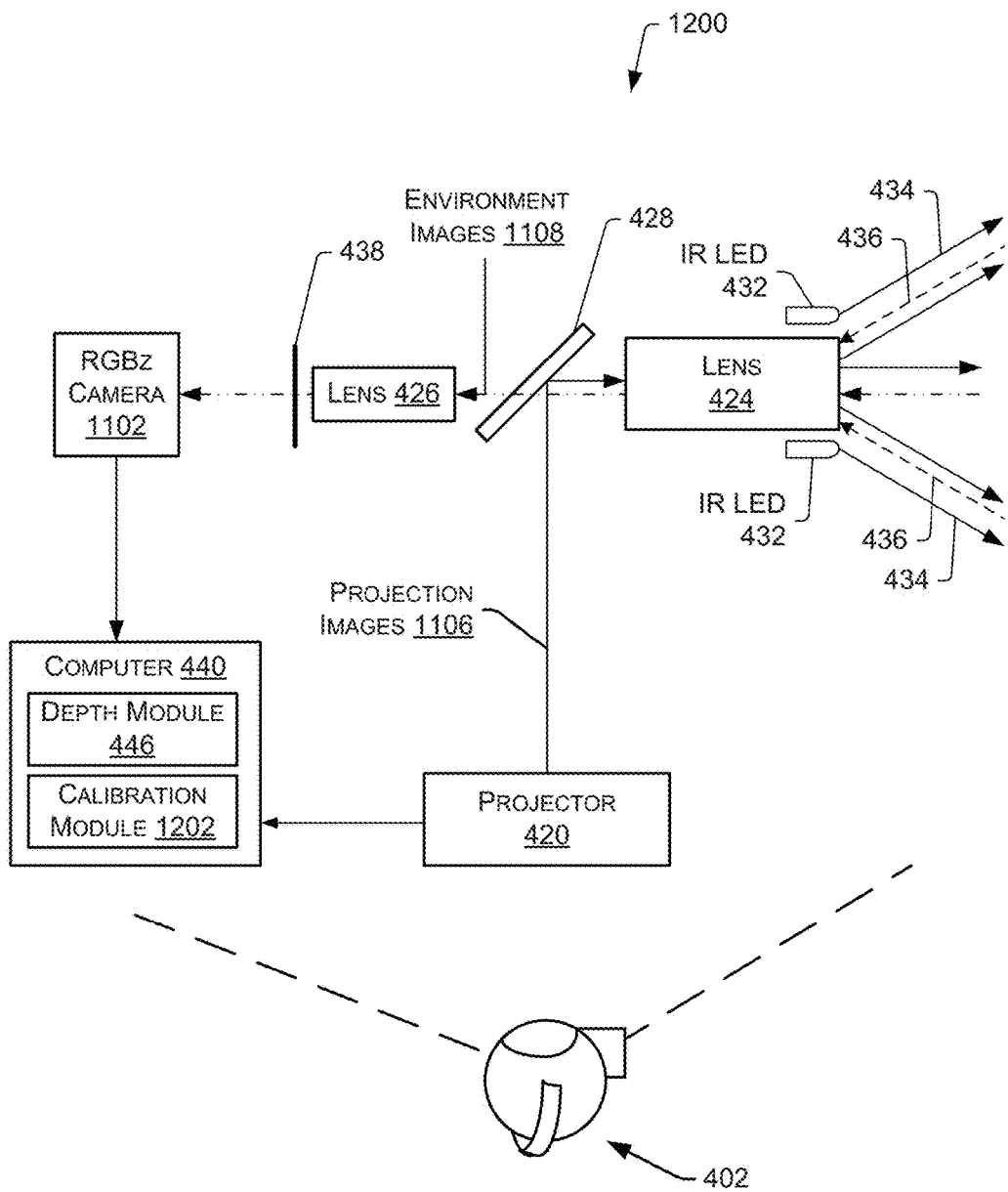
FIG. 12 shows a projection and camera system that shares a common optical path similar to FIG. 4, but is also implemented with a second type of image noise cancelation component that reduces or removes image noise caused by internal reflection of the projected image.
Figure 13:
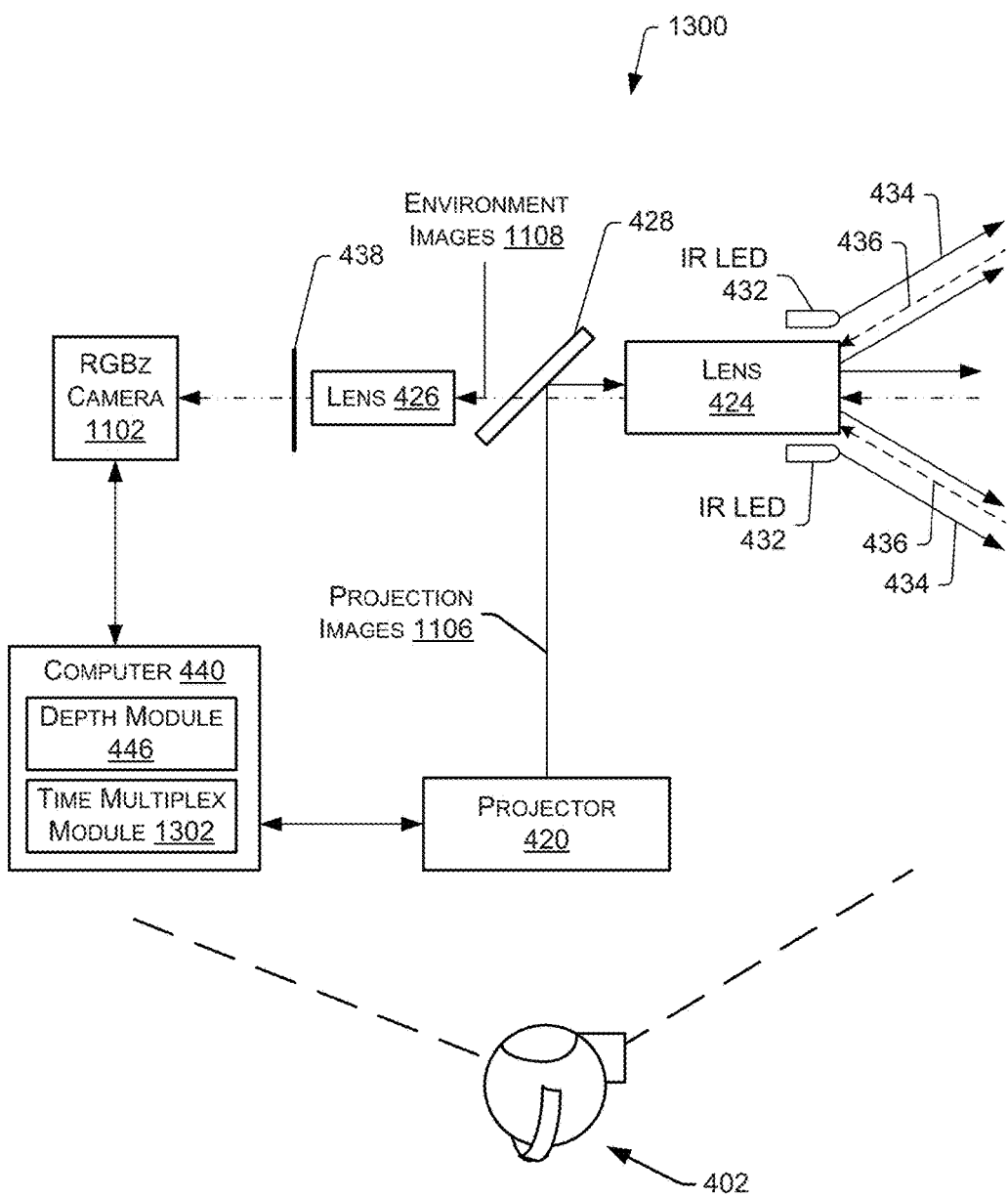
FIG. 13 shows a projection and camera system that shares a common optical path similar to FIG. 4, but is also implemented with a third type of image noise cancelation component that reduces or removes image noise caused by internal reflection of the projected image.

To alleviate this potential problem, the ARFN is equipped with an internal image noise cancelation component to partially remove, from the environment images to be captured by the camera, any internal reflection of the projection images projected by the projector along at least a portion of the shared optical path. The internal noise cancelation component may be implemented in a number of ways, including through use of polarization techniques, calibration techniques, and/or coordinated time multiplexing techniques. FIGS. 11-13 show these three example techniques to cancel, remove, or otherwise reduce the unwanted image noise caused by internal reflection along the same optical path. These are merely representative examples, and other techniques may be employed since the interfering images are known (i.e., they are the images projected from the projector) and able to be removed.

FIG. 11 shows a first component arrangement 1100 that may be used in an implementation of the ARFN 102(2) or 102(3), where the projector, camera, and depth sensor share a common optical path to achieve a compact form factor. In this arrangement 1100, the components are similar to those found in the implementation of FIG. 4, but a component 1102 comprising imaging and/or depth sensors replaces the time-of-flight sensor 422. The component 1102 may be configured in any number of ways and may include a depth sensor 1102(A), a camera 1102(B), or a combination of depth and imagining units. The depth sensor may be implemented, for example, using an infrared sensor, a thermal sensor, or other type of sensor from which range or depth may be measured. The camera may be implemented using any type of imaging device, such as an RGB camera. In one implementation, the component 1102 is implemented as an RGBz camera. An RGBz camera captures color images using red, blue, and green color segments, and includes an integrated depth sensor to provide a depth or "z" dimension (hence, "RGBz"). This implementation also differs from that of FIG. 4 in that it employs a first example of an internal noise cancelation component for canceling or reducing image noise that may be caused by internal reflection of the projected images along the common optical path.

According to the first image noise cancelation technique, polarization elements are used to differentiate the projection images output by the projector from the returning environment images captured by the camera. In the illustrated implementation, a first polarization element 1104 is positioned to polarize the projection images 1106 output from the projector 420 according to a first polarization. As one example, the first polarization element 1104 may be formed with a clockwise or vertical polarization. The polarization element 1104 may be implemented in a number of ways (e.g., a polarization layer on a lens or mirror) and it may be integrated with the projector 420. The element 1104 is illustrated as a separate element to emphasize that the projection images 1106 are polarized prior to traveling along the common optical path through the lens 424.

The projection images 1106 are output through the lens 424. At least a portion of the polarized projection images 1106 are reflected internally, such as when the image passes across an interface between air and a surface (e.g., lens, mirror). The internally reflected portions maintain the same polarization.

Environment images 1108 are received from the environment along the common optical path through the lens 424. The environment images 1108 are directed through a lens 426 toward the RGBz camera 1102. In addition, the internally reflected and polarized projection images 1106 may also be directed toward the camera 1102.

A second polarization element 1110 is positioned to polarize the environment images 1108 according to a second polarization that is different than the first polarization. For instance, the second polarization element 1110 may be formed with a counterclockwise or horizontal polarization. The polarization element 1110 may be implemented in a number of ways (e.g., formed as a polarization layer on a lens or mirror) and it may be integrated with the camera 1102.

In this manner, the projection images 1106 that are polarized according to the first polarization (e.g., clockwise or vertical) are substantially rejected or filtered when passed through the second polarization element 1110 with the second polarization (e.g., counterclockwise or horizontal). As a result, the unwanted image noise from the internally reflected projection images is substantially removed.

FIG. 12 shows another component arrangement 1200 that may be used in an implementation of the ARFN 102(2) or 102(3). The component arrangement 1200 includes a second example of an internal image noise cancelation component for canceling or reducing image noise that may be caused by internal reflection of the projected images along the common optical path and internally scattered stray light. In this implementation, a calibration module 1202 is shown executing on the processor of the computer 440. The calibration module 1202 receives a digital representation of the projection images 1106 output by the projector 420. In one embodiment, the projected image may be directed to a light trap where the image is captured by a separate camera. In another embodiment, the projector provides the digital data used to generate the images.

The calibration module 1202 further receives a digital representation the environment image 1108 captured by the depth/imager component 1102, which is configured in this implementation as an RGBz camera. The captured environment image 1108 includes image noise from the internally reflected and internally scattered stray light that results from sharing a common optical path. The calibration module 1104 subtracts the internally reflected and internally scattered stray light from the corresponding environment image that includes at least part of the projection image. In this manner, those image portions associated with the projection image are removed or substantially attenuated as a result of this digital image processing. In some implementation, this processing may be handled on a pixel by pixel basis.

FIG. 13 shows still another component arrangement 1300 that may be used in a small form factor implementation, such as that found in the ARFN 102(2) or 102(3). The component arrangement 1300 provides a third example of an internal image noise cancelation component for canceling or reducing image noise that may be caused by internal reflection of the projected images along the common optical path. With this technique, a time multiplex module 1302 is executed by the processor of the computer 440 to coordinate capture of at least one color component of the environment images 1108 by the RGBz camera 1102 while concurrently the projection images 1106 from the projector 420 are void of the at least one color component.

As one example implementation, the projector 420 uses a color wheel having four segments: a red segment, a green segment, a blue segment, and a clear segment. It is noted that other colors may be used, such as cyan, magenta, and yellow. Further, other color segmentation techniques may be used in place of a color wheel. For instance, time-based segmentation of color sources, such as LED, may be employed. A synchronization signal is sent to the time multiplex module 1302 as each segment is output. The time multiplex module 1302 outputs a coordination signal to the RGBz camera 1102 to capture one or more other color segments. For example, suppose the projector 420 is transitioning through a red segment on the color wheel. The time multiplexing module 1302 coordinates the image capture operation of the RGBz camera to capture either green or blue color segments, while filtering out any red color segments as this likely includes internal reflection artifacts from the red segments of the projection images 1106. When the projector 420 moves to the green segment on the color wheel, the time multiplex module 1302 coordinates the RGBz camera 1102 to capture either red or blue color segments, again avoiding the color segment being projected. In a slight variation of this implementation, the RGBz camera 1102 may be configured to capture the entire RGB components, but discards the component that is currently being projected.

There are other ways to implement time spaced projection of a color segment and capture of other color segments. This may also be done, for example, by configuring phosphor-based projectors to synchronize the firing of different colored phosphors. Other types of color light sources may be used as well. Further, with time division multiplex, the system 1300 may add one or more time segments in which the illumination of the light source is cycled off During this brief period, there is no image projection. Hence, unwanted reflection portions and internal stray light that is corrupting the image are identified for removal.

While three implementations are described, other implementations are possible. For instance, other implementations may be formed by combining two or more of these techniques. As an example, a component arrangement may be configured to include both polarization techniques of arrangement 1100 in FIG. 11 together with the calibration module 1202 of the arrangement 1200 in FIG. 12. In another example, a component arrangement may be configured to include both polarization techniques of arrangement 1100 in FIG. 11 together with the time multiplex module 1302 of the arrangement 1300 in FIG. 13. In still another example, a component arrangement may be configured to include both the calibration module 1202 of arrangement 1200 in FIG. 12 together with the time multiplex module 1302 of the arrangement 1300 in FIG. 13. And, in yet another example, a component arrangement may be configured to include the polarization techniques of arrangement 1100 in FIG. 11, together with the calibration module 1202 of arrangement 1200 in FIG. 12, together with the time multiplex module 1302 of the arrangement 1300 in FIG. 13.

Illustrative Process

Figure 14:
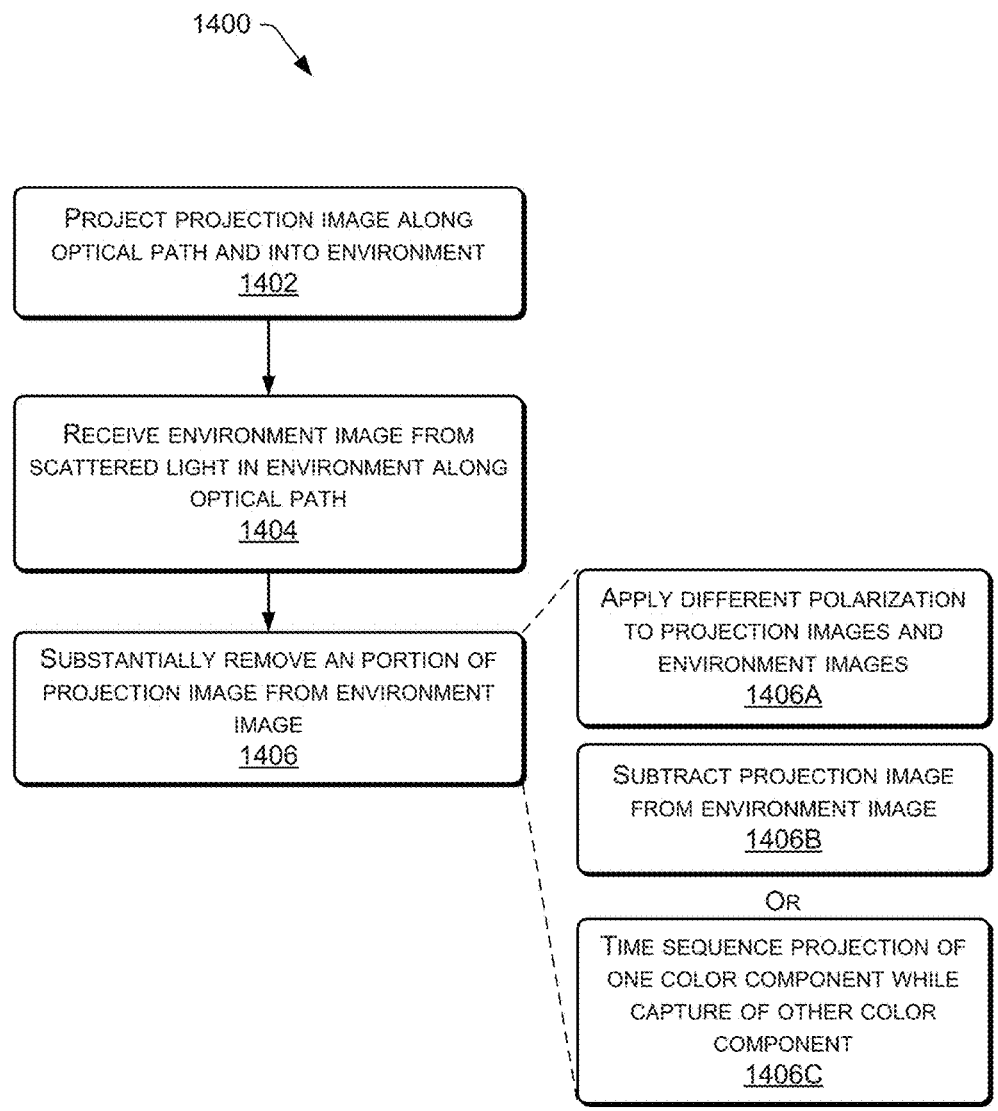
FIG. 14 shows an illustrative process of canceling internal image noise within a projection and camera system that shares a common optical path.

FIG. 14 shows an illustrative process 1400 of canceling internal image noise within a projection and camera system that shares a common optical path. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1402, a projection image is projected along an optical path into an environment. As shown in various figures, the projector 422 may output projection images that are directed along an optical path defined by the lens 424.

At 1404, an environment image is received from the environment along at least part of the same optical path such that the projection image and the environment image share the optical path. As shown in FIGS. 11-13, for example, the projection images 1106 and the environment images share a common optical path through the lens 424 in order to obtain a more compact form factor. One unwanted artifact of this configuration is that the projection images may be partially reflected internally and cause image noise on the environment images that are being captured by the camera 1102.

Accordingly, at 1406, the internally reflected and internally generated stray light is at least partially removed from the environment image. In this manner, the unwanted artifacts caused by the internal reflection are substantially canceled. There are a number of ways to remove the portions of projection image. According to a first technique, at 1406A, different polarizations are applied to the projection image and the environment image so that the camera can at least partially reject the projection image of a different polarization. This process may be implemented, for example, by the component arrangement 1100 of FIG. 11.

A second technique, at 1406B, is to subtract the projection image from the environment image. This process may be implemented, for example, by the component arrangement 1200 of FIG. 12. Here, a calibration module receives the projection image from the projector (either a digital version or a captured output), and effectively removes this projection image from the environment image that includes portions of the projecting image due to internal reflection.

A third technique, at 1406C, is to time sequence the image projection with image capture so one color segment is being captured within the environment image while another color segment is being output to form the projection image. This process may be implemented, for example, by the component arrangement 1300 of FIG. 13.

In this manner, the methodology enabled by the projection and camera system allows for simultaneous and coaxial operation of the following functions: (1) visible light, high intensity, zoomable image projection; (2) illumination of a controlled area of interest with modulated IR light and collection of scattered IR light for depth calculation; and (3) receipt of images from a populated landscape to form an image on camera. Further, any noise caused by internal reflection of the projected image is substantially eliminated or attenuated from the captured environment image.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A device comprising:
a head structure;
a base structure connected to the head structure by an arm mechanism; and
a plurality of components housed in one or more of the head structure or the base structure, the plurality of components comprising:
a lens defining a portion of a first optical path;
an illumination component having a second optical path, the second optical path including a first illumination segment and a second illumination segment, wherein the second illumination segment of the second optical path is configured to illuminate at least a portion of an environment along the portion of the first optical path;
a projector to project projection images onto a surface of the environment, the projector having a third optical path including a first projection segment and a second projection segment, wherein the second projection segment of the third optical path is configured to output the projection images along at least the portion of the first optical path, and wherein the first projection segment of the third optical path and the first illumination segment of the second optical path are substantially parallel and non-coaxial;
a depth sensor to receive at least a portion of light from the illumination component scattered by the environment, the light being received along at least the portion of the first optical path, wherein the depth sensor is configured to determine a time of flight value associated with one or more objects in the illuminated portion of the environment;

a camera to capture environment images from the environment while the projector concurrently projects the projection images, the camera receiving the environment images along at least the portion of the first optical path;

an image noise cancelation component to at least partially remove, from the environment images captured by the camera, internal reflection of the projection images projected by the projector along at least the portion of the first optical path; and a processor to determine distance information of the one or more objects relative to the time of flight sensor, the distance information determined based at least in part on the determined time of flight value.

2. The device of claim 1, wherein the illumination component, the lens, the depth sensor, and the projector are arranged within the head structure.

3. The device of claim 1, wherein the illumination component, the lens, the depth sensor, and the projector are arranged within the head structure and the processor resides in the base structure.

4. The device of claim 1, wherein the image noise cancelation component comprises first and second polarization elements, the first polarization element configured to polarize the projection images from the projector according to a first polarization and the second polarization element to polarize the environment images captured by the camera according to a second polarization that is different than the first polarization.

5. The device of claim 1, wherein the image noise cancelation component comprises a calibration module executed by the processor to receive the projection image and subtract the projection image from a corresponding environment image that includes at least part of the projection image.

6. The device of claim 1, wherein the image noise cancelation component comprises a time multiplex module executed by the processor to coordinate capture of at least one color segment of the environment images by the camera while concurrently the projection images from the projector are void of the at least one color component.

7. The device of claim 1, wherein the image noise cancelation component comprises:
polarization elements to polarize the projection images from the projector according to a first polarization and to polarize the environment images captured by the camera according to a second polarization that is different than the first polarization; and
a calibration module executed by the processor to receive the projection image and subtract the projection image from a corresponding environment image that includes at least part of the projection image.

8. The device of claim 1, wherein the image noise cancelation component comprises:
polarization elements to polarize the projection images from the projector according to a first polarization and to polarize the environment images captured by the camera according to a second polarization that is different than the first polarization; and
a time multiplex module executed by the processor to coordinate capture of at least one color segment of the environment images by the camera while concurrently the projection images from the projector are void of the at least one color component.

9. The device of claim 1, wherein the image noise cancelation component comprises:
a calibration module executed by the processor to receive the projection images and subtract the projection images from a corresponding environment images that includes at least part of the projection images; and
a time multiplex module executed by the processor to coordinate capture of at least one color segment of the environment images by the camera while concurrently the projection images from the projector are void of the at least one color component.

10. The device of claim 1, wherein the image noise cancelation component comprises:
polarization elements to polarize the projection images from the projector differently according to a first polarization and to polarize the environment images captured by the camera according to a second polarization that is different than the first polarization;
a calibration module executed by the processor to receive the projection image and subtract the projection image from a corresponding environment image that includes at least part of the projection image; and
a time multiplex module executed by the processor to coordinate capture of at least one color segment of the environment images by the camera while concurrently the projection images from the projector are void of the at least one color component.

11. The device of claim 1, wherein the illumination component comprises an infrared (IR) device to generate IR light.

12. The device of claim 1, wherein the illumination component comprises an infrared (IR) device to generate IR light that is directed through the lens along the first optical path.

13. The device of claim 1, wherein the projector projects an image that covers a first area of the scene, and the illumination component illuminates a second area of the scene, wherein the second area is larger than the first area.

14. The device of claim 1, wherein the depth sensor comprises a time-of-flight sensor.

15. The device of claim 1, further comprising:
one or more speakers arranged in the base structure; and
a power component to provide power to at least the processor, the power component residing in the base structure.

16. The device of claim 1, further comprising one or more microphones, the one or more microphones being arranged in at least one of the base structure or the head structure.

17. A system comprising:
a lens defining a portion of a first optical path;
a projector to project a projection image into an environment, the projector having a second optical path including a first projection segment and a second projection segment, wherein the first projection segment of the second optical path is substantially perpendicular to the first optical path, and wherein the second projection segment of the second optical path is configured to output the projection image through the lens and at least a portion of the second projection segment of the second optical path is coaxial with at least the portion of the first optical path;
a camera to capture environment images of light scattered in the environment while the projector concurrently projects the projection image, the environment images being received along at least the portion of the first optical path such that the projection image and the environment images are coaxial along at least the portion of the first optical path; and an image noise cancelation component to at least partially remove internal reflection of the projection image from the environment images.

18. The system of claim 17, wherein the lens comprises a zoom lens.

19. The system of claim 17, wherein the camera comprises an RGB camera.

20. The system of claim 17, wherein the camera comprises an RGBz camera having an integrated depth sensor.

21. The system of claim 17, wherein the image noise cancelation component comprises first and second polarization elements, the first polarization element configured to polarize the projection image from the projector according to a first polarization and the second polarization element to polarize the environment images captured by the camera according to a second polarization that is different than the first polarization, wherein the camera captures the environment images having the second polarization while at least partly rejecting the projection image having the first polarization.

22. The system of claim 17, wherein the image noise cancelation component comprises a calibration module to receive the projection image and subtract the projection image from a corresponding environment images that includes at least part of the projection image.

23. The system of claim 17, wherein the image noise cancelation component comprises a time multiplex module to coordinate capture of at least one color segment of the environment images by the camera while concurrently the projection image from the projector is void of the at least one color component.

24. The system of claim 17, wherein the image noise cancelation component comprises:
polarization elements to polarize the projection image according to a first polarization and to polarize the environment images captured by the camera according to a second polarization that is different than the first polarization; and
a calibration module to receive the projection image and subtract the projection image from a corresponding environment image that includes at least part of the projection image.

25. The system of claim 17, wherein the image noise cancelation component comprises:
polarization elements to polarize the projection image from the projector according to a first polarization and to polarize the environment images captured by the camera according to a second polarization that is different than the first polarization; and
a time multiplex module to coordinate capture of at least one color segment of the environment images by the camera while concurrently the projection image from the projector is void of the at least one color component.

26. The system of claim 17, wherein the image noise cancelation component comprises:
a calibration module to receive the projection image and subtract the projection image from a corresponding environment image that includes at least part of the projection image; and
a time multiplexing module to coordinate capture of at least one color segment of the environment images by the camera while concurrently the projection image from the projector is void of the at least one color component.

27. The system of claim 17, further comprising:
an illumination component to illuminate an area external to the system; and
a time-of-flight component to receive light scattered from the illuminated area and determine a time-of-flight value associated with one or more objects in the illuminated area, the light being received through the lens and directed along at least the portion of the first optical path.

28. A method comprising:
projecting a projection image along a first optical path and into an environment, the first optical path including a first projection segment and a second projection segment;
illuminating the environment with a light source, the illumination having a second optical path including a first illumination segment and a second illumination segment, wherein the first illumination segment is substantially parallel and non-coaxial with the first projection segment of the first optical path;
receiving an environment image from the environment along at least a portion of the first optical path concurrent with the projecting of the projection image, wherein the projection image and the environment image are coaxial along at least part of the first optical path; and
partially removing reflected portions of the projection image from the environment image.

29. The method of claim 28, wherein partially removing comprises applying different polarizations to the projection image and the environment image to at least partially reject the projection image of a different polarization.

30. The method of claim 28, wherein partially removing comprises subtracting the projection image from the environment image.

31. The method of claim 28, wherein partially removing comprises capturing at least one color segment of the environment image while the projection image is void of the at least one color component.

* * * * *